Nov. 1, 1938.  F. H. BENGE  2,135,380
METHOD OF MAKING COMPOSITE ARTICLES
Filed July 8, 1936
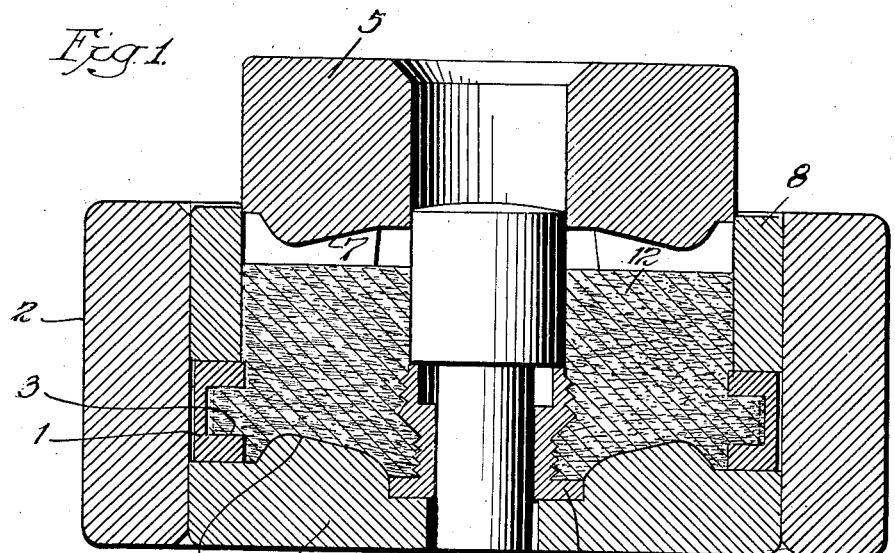
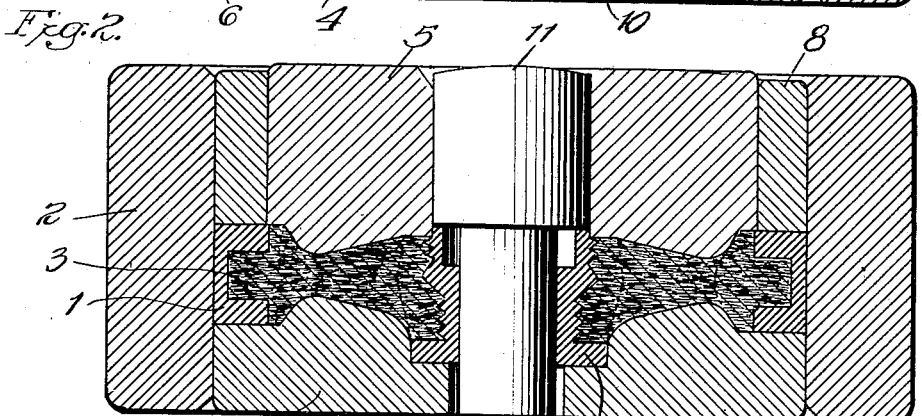
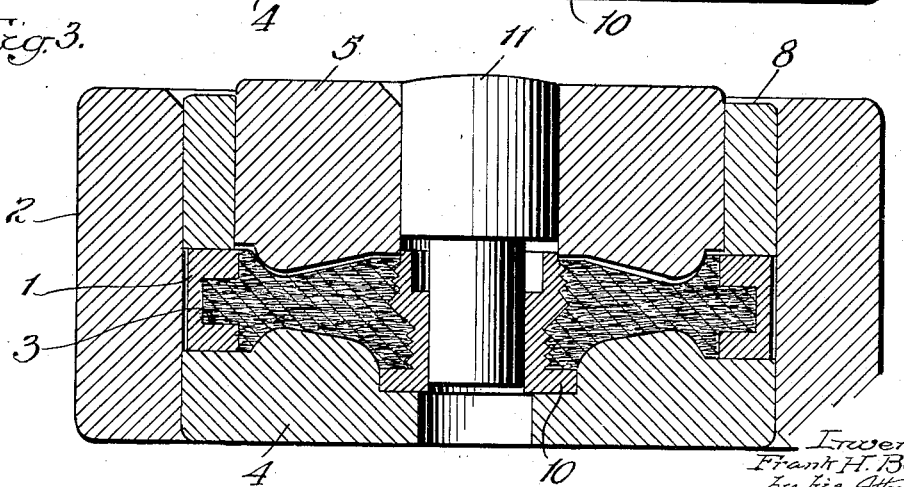
Inventor:
Frank H. Benge
by his Attorneys Patented Nov. 1, 1938

2,135,380

UNITED STATES PATENT OFFICE 2,135,380

METHOD OF MAKING COMPOSITE ARTICLES

Frank H. Benge, Norristown, Pa., assignor to Continental-Diamond Fibre Company, Newark, Del., a corporation of Delaware Original application August 13, 1935, Serial No. 35,994. Divided and this application July 8, 1936, Serial No. 89,677

3 Claims. (Cl. 18—59)

This invention relates to a novel method of making composite articles and more particularly composite gears or like elements formed of metallic and non-metallic materials. The present application is a division of copending application, Serial No. 35,994, filed August 13, 1935. The principal object of the present invention is to provide a novel method of making the improved gear claimed in the said copending application.

A more specific object of the present invention is to provide a gear having a composite rim formed of complementary metallic and non-metallic parts wherein the parts are caused to fit snugly and become firmly secured to one another.

A further object of the present invention is to provide a gear of this character wherein a metallic rim is caused to contract tightly about a non-metallic part by expanding the metallic rim during manufacture of the gear to cause contraction of the rim during subsequent shrinkage of the non-metallic part.

The invention may be clearly understood by reference to the accompanying drawing illustrating the principal steps of the method.

In the accompanying drawing:

Fig. 1 is a sectional view illustrating the initial step in the molding of a gear according to the present invention;

Fig. 2 is a similar view illustrating the next step in the process and showing the expansion of the metallic rim; and Fig. 3 is a similar view illustrating the final step and showing the contraction of the metallic rim about the shrunken non-metallic part.

As set forth in the copending parent application above mentioned, the gear to which the present invention is directed comprises a non-metallic body and a metallic rim. The non-metallic body may be formed of any suitable material such as Bakelite, hard rubber, hard wood such as lignum-vitae, leather or rawhide, etc. Preferably, however, the non-metallic body is formed of resin-impregnated fabric in laminated form or more advantageously of small pieces of fabric material impregnated with a synthetic resin binder, for example a phenolic resin, and, more specifically, a phenol-formaldehyde resin. The scrap material resulting from the manufacture of laminated products may be advantageously employed in this instance, since the use of such scrap material, which would otherwise be wasted, effects a saving in the cost of the gear. It is preferable also to form the different parts of the non-metallic body of the same material, these portions of the gear being formed integrally in accordance with the method described hereinafter. The metallic rim may be formed of any suitable metal having the desired strength. Preferably steel is employed in the formation of this rim.

Referring now to the drawing, in the manufacture of the gear a solid steel ring 1 is placed in a mold 2 whose inner diameter is larger than the outer diameter of the steel rim by a predetermined amount. The rim 1 is preferably provided with one or more annular inner recesses, such as shown at 3, for reasons set forth in the copending parent application but which need not be gone into here. It suffices to state here that this structure provides a composite metallic and non-metallic rim or toothed portion on the finished gear. In the employment of the preferred materials above mentioned, the mold 2 has an inner diameter which is one-thirty-second ($\frac{1}{32}$) of an inch larger than the outer diameter of the steel rim 1. The mold members 4 and 5 have complementary surfaces 6 and 7, respectively, which conform to the shape of the non-metallic surfaces desired on the finished gear. A metallic ring 8 is placed within the mold upon the steel rim 1. This ring serves as a guide for the mold part 5 and also serves to keep the fibrous material away from the upper surface of the steel rim 1. If a metallic bushing 10 is employed, it may be inserted in the mold, as clearly shown in Fig. 1. A central pin 11 serves to guide the movable mold part 5 and also serves to keep the fibrous material from falling into the interior of the bushing 10.

With the above-mentioned parts in place, the interspersed pieces 12 of fibrous or fabric material are placed in the mold in predetermined quantity, as shown in Fig. 1, these fibrous pieces having been impregnated with phenol formaldehyde resin in its initial stage in which it is fusible. These resin-impregnated fibrous pieces may vary widely in size, generally varying from one eighth inch at the smallest width up to one inch at the greatest width. The resin associated with the fibrous pieces varies from 40% to 60%, the latter figure being preferable and at times powdered resin may be added if it is desired or necessary.

After the resin-impregnated fibrous material has been placed in the mold, the movable mold part 5 is lowered under pressure, which may be in the neighborhood of 2500 lbs. per square inch. Due to the resilience of the steel rim 1, the pressure expands the rim against the mold wall, as illustrated in Fig. 2, thus placing the rim under tension within its elastic limit. The resin-impregnated fibrous material enters and fills the recess 3 as clearly shown. The resin-impregnated fibrous material is then subjected to a temperature of between 360° F. and 400° F. at the same time that the pressure is applied to convert the resin to its final and infusible stage. The time of heating depends upon the size of the gear and may be in the neighborhood of thirty minutes or more. The curing is carried out at a temperature and for a time sufficient to convert the resin into its final stage in which it is infusible and insoluble. During this heating process, the conversion or curing of the resinous binder causes the resin-impregnated fibrous material to contract or shrink. By virtue of the tension of the steel rim, the rim likewise contracts so that it is maintained in snug engagement with the fibrous material in the finished product. In Fig. 3, the movable mold part 5 has been raised slightly following the conversion process, and the contraction of the steel rim against the shrunken or contracted fibrous material is illustrated. The reason for having the mold larger than the steel rim to permit expansion of the rim will now be apparent. This method insures a snug fit and firm bondage of the steel rim about the fibrous material. It will be obvious that in any instance the expansion of the metal rim should be predetermined for the particular non-metallic material used, within the limit of elasticity of the metal. This presumes of course a non-metallic material which contracts or shrinks during the conversion process.

After the composite article is removed from the mold, the teeth may be cut in the composite rim of the gear to provide the structure disclosed and claimed in the copending parent application. The teeth may be cut in any suitable manner known to the art since the product has the necessary machining qualities and strength.

A gear constructed in accordance with the invention is far superior to the ordinary composite gear made entirely of non-metallic material and yet retains the desired qualities of such gear, such as quiet operation and economy of production. Comparative tests have shown that the gear formed by this invention will outlast the ordinary composite gear in the ratio of approximately 20 to 1. In a specific case, under a certain test load, an ordinary composite gear ran for only five hours before failure, whereas a gear constructed according to the invention showed no indications of failure after one hundred hours. The cost of manufacture of the present gear is not much greater than the cost of manufacture of the ordinary composite gear, and the increased cost is fully warranted by the improved results obtained.

Although the invention has been described with reference to the preferred method of making the product, it is obviously susceptible to modifications such as may occur to persons skilled in the art.

I claim:

1. A method of making a composite machine element, such as a gear, which comprises placing a metallic rim having at least one inner annular recess in a mold of predetermined diameter greater than that of the rim, depositing interspersed pieces of fibrous material impregnated with synthetic resin in its initial stage in said mold within the rim to form the body of said gear, applying pressure to said material sufficient to form the said body with a portion thereof extending into said recess and to expand said rim outward against the mold wall thus placing said rim under tension, and converting the said resin to its final hardened stage causing the resin-impregnated fibrous material to shrink, whereby the tension of said metallic rim causes it to contract tightly about said body.

2. A method of forming a composite fibre and metal gear, which comprises placing a metallic rim in a mold of predetermined diameter greater than that of the rim, depositing interspersed pieces of fibrous material impregnated with synthetic resin in its initial stage in said mold within the rim to form the body of the gear, applying pressure to said material sufficient to form the said body and to expand said rim against the mold wall thus placing said rim under tension, and converting the said resin to its final hardened stage causing the resin-impregnated fibrous material to shrink, whereby the tension of said metallic rim causes it to contract tightly about said body.

3. A method of forming a composite fibre and metal gear, which comprises placing a metallic rim in a mold of predetermined diameter greater than that of the rim, depositing interspersed pieces of fibrous material impregnated with phenolic resin in its fusible stage in said mold within the rim to form the body of the gear, applying pressure to said material sufficient to form the said body and to expand said rim against the mold wall thus placing said rim under tension, and converting the said resin to its final insoluble stage causing the resin-impregnated fibrous material to shrink, whereby the tension of said metallic rim causes it to contract tightly about said body.

FRANK H. BENGE.